United States Patent (12) United States Patent
Mennen et al.

(10) Patent No.: US 7,093,383 B2
(45) Date of Patent: Aug. 22, 2006

(54) AUTOMATIC HYDRAULIC LOAD LEVELING SYSTEM FOR A WORK VEHICLE

(75) Inventors: Kenneth C. Mennen, Milwaukee, WI (US); Joseph L. Pfaff, Wauwatosa, WI (US)

(73) Assignee: HUSCO International Inc., Waukesha, WI (US)

( * ) Notice: Subject to any disclaimer, the term of this patent is extended or adjusted under 35 U.S.C. 154(b) by 245 days.

(21) Appl. No.: 10/811,401

(22) Filed: Mar. 26, 2004

(65) Prior Publication Data

US 2005/0210713 A1    Sep. 29, 2005

(51) Int. Cl.
*E02F 5/02* (2006.01)
*G05D 1/02* (2006.01)

(52) U.S. Cl. .................... 37/348; 37/414; 414/699; 701/50

(58) Field of Classification Search ............... 37/348, 37/382, 414, 347; 414/699–701; 701/50; 700/61–63
See application file for complete search history.

(56) References Cited

U.S. PATENT DOCUMENTS

| 3,661,051 | A | * | 5/1972 | Dunne et al. ............... 700/245 |
| 4,691,805 | A | | 9/1987 | Kishi |
| 4,722,044 | A | | 1/1988 | Heiser et al. |
| 4,767,256 | A | | 8/1988 | Knight |
| 4,791,549 | A | | 12/1988 | Heiser et al. |
| 4,910,662 | A | | 3/1990 | Heiser et al. |
| 4,910,673 | A | * | 3/1990 | Narisawa et al. ............. 701/50 |
| 4,923,362 | A | | 5/1990 | Fryk |
| 5,211,259 | A | | 5/1993 | Kishi |
| 5,442,868 | A | * | 8/1995 | Ahn ........................... 37/348 |
| 6,098,322 | A | * | 8/2000 | Tozawa et al. ................ 37/414 |
| 6,256,566 | B1 | * | 7/2001 | Kamiya et al. ............... 701/50 |
| 6,374,153 | B1 | * | 4/2002 | Brandt et al. ................ 700/188 |
| 6,438,953 | B1 | * | 8/2002 | Kamada ....................... 60/422 |
| 6,584,710 | B1 | * | 7/2003 | Lin et al. ....................... 37/348 |
| 6,609,315 | B1 | | 8/2003 | Hendron et al. |
| 6,718,759 | B1 | * | 4/2004 | Tabor .......................... 60/368 |
| 6,732,512 | B1 | * | 5/2004 | Pfaff et al. .................... 60/428 |
| 6,775,974 | B1 | * | 8/2004 | Tabor .......................... 60/422 |
| 6,951,102 | B1 | * | 10/2005 | Tabor .......................... 60/368 |
| 2005/0216105 | A1 | * | 9/2005 | Tabor .......................... 700/63 |

FOREIGN PATENT DOCUMENTS

JP        2000220601    *    8/2000

* cited by examiner

*Primary Examiner*—Thomas A Beach
(74) *Attorney, Agent, or Firm*—Quarles & Brady LLP (57) ABSTRACT

A machine has a boom, that is pivotally raised and lowered by a first cylinder, and has a load carrier that is pivoted at the end of the boom by a second cylinder. As a machine operator commands movement of the boom, the position of the load carrier is automatically altered by a controller to prevent a load from falling off the load carrier. The load carrier position with respect to the boom is altered in response to the amount of boom motion to maintain a constant position relationship between the load carrier and a chassis of the machine. Although the boom and load carrier move through different angular positions, the machine control is expressed in terms of the linear motion of the first and second cylinders.

25 Claims, 3 Drawing Sheets

AUTOMATIC HYDRAULIC LOAD LEVELING SYSTEM FOR A WORK VEHICLE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic systems, and in particular to such systems that control hydraulic actuators on a work vehicle to maintain a predefined angular position of a load carrier as the load is raised and lowered.

2. Description of the Related Art

Construction and agricultural machines employ hydraulic systems to operate different mechanical elements. For example, a telehandler is a common material handling machine that has a pair of forks or a platform attached to the end of a telescopic boom pivotally attached to a tractor. Separate hydraulic actuators are employed to change the pivot angle, i.e. raise and lower the boom, and change the length of the boom, with each of those operations being referred to as a "function" of the machine. Another hydraulic actuator tilts the forks or platform with respect to the boom. The term "hydraulic actuator", as used herein, generically refers any device, such as a cylinder or a motor, that converts hydraulic fluid flow into mechanical motion.

Historically, the machine operator controlled each function independently by manipulating different control levers. Each control lever was mechanically linked to operate a valve that governed the flow of pressurized fluid from a pump to the associated hydraulic cylinder and the return flow of fluid to a tank that supplied the pump.

There is a present trend away from mechanically operated hydraulic valves toward electrical controls using solenoid operated valves and control levels of electrical joysticks. Electrical control systems enable the valves to be located remotely from the operator cab, such as on the cylinder being controlled for example. This simplifies the hydraulic plumbing on the machine, as only a single pair of supply and tank return lines need to be run to service all the hydraulic actuators on a boom. Electrical operation of the valves also enables computerized control of the machine functions to provide additional capabilities that are unachievable with purely mechanical controls.

The operator may have to manipulate several control levers simultaneously in order to perform a given machine operation. In the case of a telehandler for example, as the boom is being raised or lowered, the position of the load carrier with respect to the boom must be varied to maintain the load carrier level and prevent a load from sliding off. Therefore, as the operator controls the hydraulic actuator that varies the boom pivot angle, the hydraulic actuator for the load carrier tilt also must be operated in a precisely controlled manner. Such simultaneous, coordinated maneuvers can be difficult to perform, especially by inexperienced operators.

Because it is desirable to simplify the operator control, several mechanical or hydraulic mechanisms have been developed to automatically maintain the load carrier level while the boom is being raised or lowered. For example, U.S. Pat. No. 4,767,256 discloses a second cylinder connected between the boom and the base on which the boom is mounted. As the boom moves up and down, fluid is exchanged between the second cylinder and the load carrier cylinder which causes the load carrier to pivot with respect to the boom in a manner that maintains a constant orientation of the load carrier with respect to the base.

Nevertheless, it is desirable to provide an electronic system that automatically maintains the load carrier level while the boom is being raised or lowered, without the need for an additional hydraulic cylinder.

SUMMARY OF THE INVENTION

A method is provided for controlling movement of a load carrier to prevent a load from falling off as the boom moves up and down. The load carrier is pivotally attached to the boom which in turn is pivotally mounted on a machine chassis, such as a telehandler tractor for example. A linear load carrier hydraulic actuator produces movement of the load carrier with respect to the boom and a linear lift hydraulic actuator produces movement of the boom with respect to the machine chassis.

The method comprises receiving a boom velocity command designating a desired linear velocity for the lift hydraulic actuator. The boom velocity command can be produced from one of a number of sources, such as by the machine operator manipulating an electrical joystick. The position of the lift hydraulic actuator is sensed, as is the position of the load carrier hydraulic actuator. Those sensed linear positions are employed to derive a setpoint position that denotes an orientation at which the load carrier should be maintained as the boom is raised or lowered. An error value is generated in response to deviation of the actual load carrier position from the setpoint position.

A load carrier velocity command is produced based on the boom velocity command and the position of the lift hydraulic actuator. In a preferred embodiment of the present method, the load carrier velocity command is generated by converting the boom velocity command into an angular boom velocity command. Then the angular boom velocity command is transformed into an angular load carrier velocity command and the load carrier velocity command is produced by converting the angular load carrier velocity command into a desired linear velocity.

The load carrier velocity command and the error value are then employed to generate an adjusted load carrier velocity command which is used to operate the load carrier hydraulic actuator.

This method automatically operates the load carrier hydraulic actuator to alter the position of the load carrier with respect to the end of the boom in a manner that maintains a constant relationship between the load carrier and the machine chassis as the boom raises and lowers. Thus the load is held in the same relative position during the motion and is constrained from sliding off the load carrier.

In another version of this novel method, the velocity of the load carrier is determined. For example, that velocity is derived from changes in the position of the load carrier hydraulic actuator. A velocity error is produced in response to deviation of the load carrier velocity from a desired velocity, and the velocity error also is used to produce the error value.

DETAILED DESCRIPTION OF THE INVENTION

Figure 1:
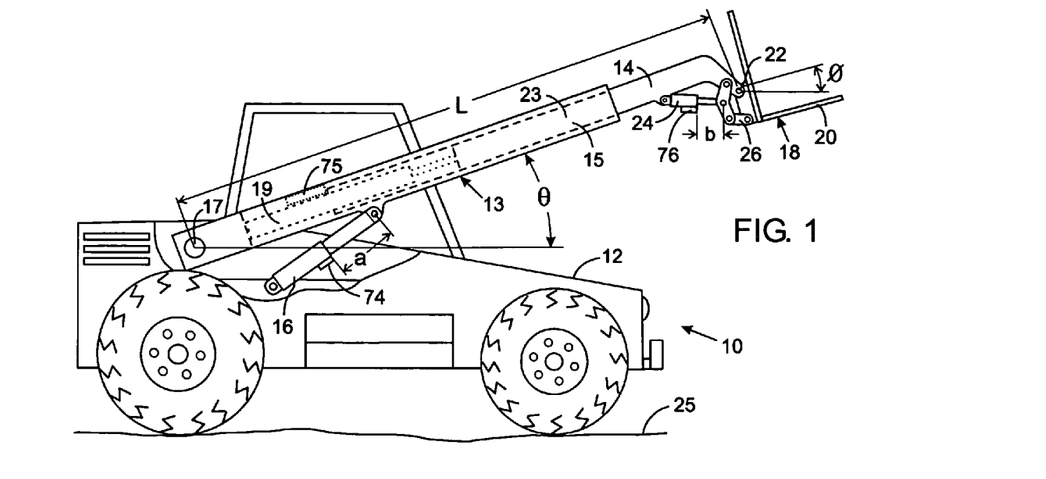
FIG. 1 is a partially cut-away, side view of a telehandler incorporating a hydraulic control system according to the present invention.

With initial reference to FIG. 1, the automatic load leveling system according to the present invention is incorporated on a telehandler 10 that comprises a chassis 12 of a vehicle on which a boom 13 is pivotally mounted. A first linear hydraulic actuator, such as a lift cylinder 16, raises and lowers the boom 13 in an arc about a pivot shaft 17, thereby varying the lift angle θ of the boom with respect to the chassis 12. The boom 13 comprises first and second sections 14 and 15 that can be extended and retracted telescopically in response to operation of a second linear hydraulic actuator, such as a length cylinder 19 within the boom. The length cylinder 19 can be directly connected to the first and second boom sections 14 and 15, as illustrated, or alternatively connected to the first section by a mechanism, such as a block and tackle, that provides a mechanical advantage.

A load carrier 18, such a pair of pallet forks 20 or a platform for lifting items or a person, is attached at pivot point 22 to the remote end of the first boom section 14. A third linear hydraulic actuator, such as cylinder 24, rotates the load carrier 18 vertically at the end of the boom 13. Linear extension of a piston rod from the load carrier cylinder 24 tilts the tips of the pallet forks 20 upward, and retraction of that piston rod lowers the fork tips. That tilting action of the load carrier cylinder 24 changes the angle of the load carrier with respect to a reference, which may be related to the chassis 12 or the earth 25.

Although the present invention is being described in the context of a telehandler with a pair of forks as the load carrier 18, it should be appreciated that the automatic leveling system can be employed with other types of hydraulically operated vehicles and stationary machines that have various kinds of load carriers pivotally coupled to a boom.

Figure 2:
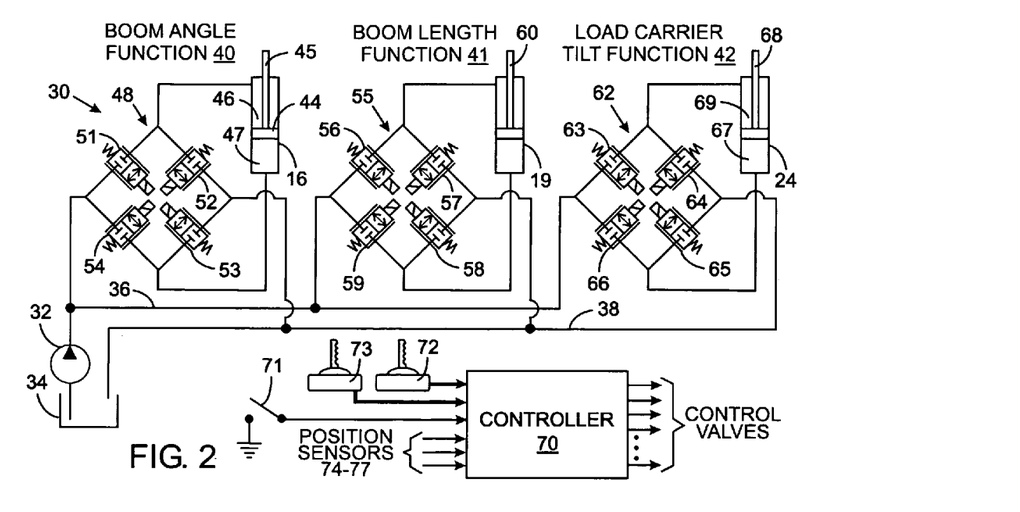
FIG. 2 is a schematic diagram of the hydraulic system for the telehandler.

With reference to FIG. 2, the cylinders 16, 19 and 24 are part of a hydraulic system 30 on the telehandler 10 that has a pump 32 which draws hydraulic fluid from a tank 34 and forces the fluid under pressure into a supply line 36. After powering a cylinder 16, 19 or 24, the fluid flows back to the tank 34 through a return line 38.

The hydraulic system 30 controls three separate machine functions 40, 41 and 42 which respectively change the boom lift angle θ, the boom length L, and load carrier tilt angle Ø. The boom angle function 40 pivots the boom 13 with respect to the chassis 12 by operating the lift cylinder 16 that includes a piston 44 to which a rod 45 is connected. The piston 44 divides the lift cylinder 16 into a rod chamber 46 and a head chamber 47. A first valve assembly 48, comprising four proportional electrohydraulic valves 51, 52, 53 and 54, couples the rod and head chambers 46 and 47 to the supply and return lines 36 and 38 in a standard bridge configuration. Each electrohydraulic valve 51–54 may be pilot operated by a solenoid, such as the valve described in U.S. Pat. No. 6,328,275, for example. The magnitude of electric current applied to a particular valve 51–54 determines the displacement of a valve element and thus the flow rate of hydraulic fluid through the valve. By selectively opening the valves in opposite bridge legs in the first valve assembly 48, hydraulic fluid can be applied to one cylinder chamber 46 or 47 and drained from the other chamber 47 or 46. In particular, opening valves 51 and 53 supplies pressurized hydraulic fluid from the supply line 36 to the rod chamber 46 to retract the first piston rod 45 into the lift cylinder 16, thereby lowering the boom 13 toward the chassis 12. Similarly, opening valves 52 and 54 supplies pressurized fluid to the head chamber 47 to extend the piston rod 45 from the lift cylinder 16 and raise the boom 13. It should be understood that the present invention can be used with hydraulic circuits having other types of electrohydraulic valve assemblies.

The boom length function 41 has a hydraulic circuit similar to that of the boom angle function 40 and includes a second assembly 55 of four proportional electrohydraulic valves 56, 57, 58 and 59 that control the flow of fluid to and from chambers of the length cylinder 19. Selective application of that fluid either extends the second piston rod 60 from the length cylinder 19, thereby pushing the first boom section 14 from the second section 15, or retracts the second piston rod 60 into the length cylinder 19, which draws the first section into the second section.

The load carrier tilt function 42 has a third valve assembly 62 with four proportional electrohydraulic valves 63, 64, 65 and 66 that control the flow of fluid to and from chambers of the load carrier hydraulic cylinder 24. Sending fluid from the supply line 36 into the head chamber 67 of the load carrier cylinder 24 extends the third piston rod 68 which tilts the forks of the load carrier 18 upward, or counterclockwise in FIG. 1. Similarly, applying supply line fluid to the rod chamber 69 of the load carrier cylinder 24 retracts the third piston rod 68, thereby tilting the load carrier forks 20 downward, or clockwise in FIG. 1. It should be noted that the mechanical linkage 26, translates the linear motion of the load carrier cylinder 24 into angular motion of the load carrier 18.

With continuing reference to FIG. 2, the four valves in assemblies 48, 55 and 62 are operated independently by a microcomputer based controller 70 that receives signals from manual input devices, represented by a pair of joysticks 72 and 73 located in the cab of the telehandler 10. The telehandler operator manipulates the first joystick 72 about two orthogonal axes to indicate the desired movement of the boom 13. The first joystick 72 is moved from the centered position about one axis to raise or lower the boom 13 thereby changing the lift angle θ. The amount of that joystick motion produces a Joystick Boom Velocity Command indicating a desired linear velocity at which the piston rod 45 should move with respect to the lift cylinder 16. Moving the first joystick 72 along the other axis extends or retracts the first boom section 14 thus changing the boom length L. Both the boom lift angle and length can be changed simultaneously by moving the first joystick 72 about both axes at the same time.

The first joystick 72 produces a pair of electrical signals, indicating its position about the two axes. The controller 70 responds to one of these electrical signals by selectively operating the first valve assembly 48 to apply hydraulic fluid to the lift cylinder 16, thereby producing the desired angular boom motion. The controller 70 responds to the signal from the second joystick 73 by operating the second valve assembly 55 to change the length L of the boom 13. Alternatively, the functionality of the controller 70 may be divided among a plurality of controllers distributed around the telehandler 10. For example, a central controller may process the joystick signals to produce velocity commands for each hydraulic actuator and individual controllers at each hydraulic actuator controls the associated valve assembly in response to the respective command.

Movement of the second joystick 73 produces a Joystick Load Carrier Velocity Command, designating a desired linear velocity at which piston rod 68 should move with respect to the third cylinder 24. This latter command causes the load carrier 18 to tilt up or down with respect to the end of the boom 13. Depending on the motion of the boom at that time, such tilting of the load carrier 18 may also change the tilt angle Ø of the load carrier with respect to a fixed reference, such as a horizontal line.

The controller 70 also receives input signals from three sensors 74, 75 and 76 in FIG. 1. A lift sensor 74 is mounted to the lift cylinder 16 to sense the distance "a" that the rod extends from the lift cylinder 16. Because distance "a" is trigonometrically related to the boom lift angle θ, this distance can be used to calculate that angle. A boom extension sensor 75 measures the distance that the first section 14 projects from the second boom section 15 and thus indicates the overall boom length L. A load carrier sensor 76 attached to the load carrier cylinder 24 produces an electrical signal denoting the distance "b" that the rod 68 extends from that cylinder. The extension distance "b" is trigonometrically related to the angular position of the load carrier 18 with respect to the boom 13 and can be used to derive that position. Alternatively, rotary encoders can be employed to measure directly the boom lift angle θ and the load carrier angular position.

Figure 3:
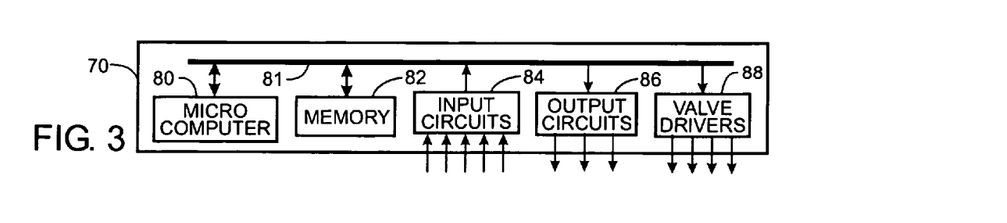
FIG. 3 is a block diagram of an electronic controller for the hydraulic system.

As shown in FIG. 3, the controller 70 comprises a microcomputer 80 which is connected by a conventional set of signal busses 81 to a memory 82 in which the software programs and data used by the microcomputer are stored. The set of signal busses 81 also connects input circuits 84 and output circuits 86 to the microcomputer 80. The input circuits 84 interface the joysticks 72 and 73, sensors and other input devices to the controller 70. The output circuits 86 provide signals to components that indicate the status of the hydraulic system 30 and the functions being controlled.

A set of valve drivers 88 responds to signals from the microcomputer by generating pulse width modulated (PWM) signals that are applied to the solenoid coils of the proportional electrohydraulic valves in assemblies 48, 55 and 62. Each PWM signal is generated in a conventional manner by switching a DC voltage at a given frequency. When the hydraulic system is on a vehicle, such as telehandler 10, the DC voltage is supplied from a battery and an alternator. By controlling the duty cycle of the PWM signal, the magnitude of electric current applied to the solenoid coil of a given valve can be varied, thus altering the degree to which that valve opens. Devices for generating the PWM signals are well known and are conventionally used to operate proportional electrohydraulic valves.

A switch 71, connected to the controller 70, activates the automatic leveling function which allows the operator to raise or lower the boom 13 with the load carrier tilt angle Ø being maintained constant without the operator having to manually control the load carrier cylinder 24. When this switch 71 is closed, the controller 70 executes a software routine that implements the control function 100 depicted by the diagram in FIG. 4.

Figure 4:
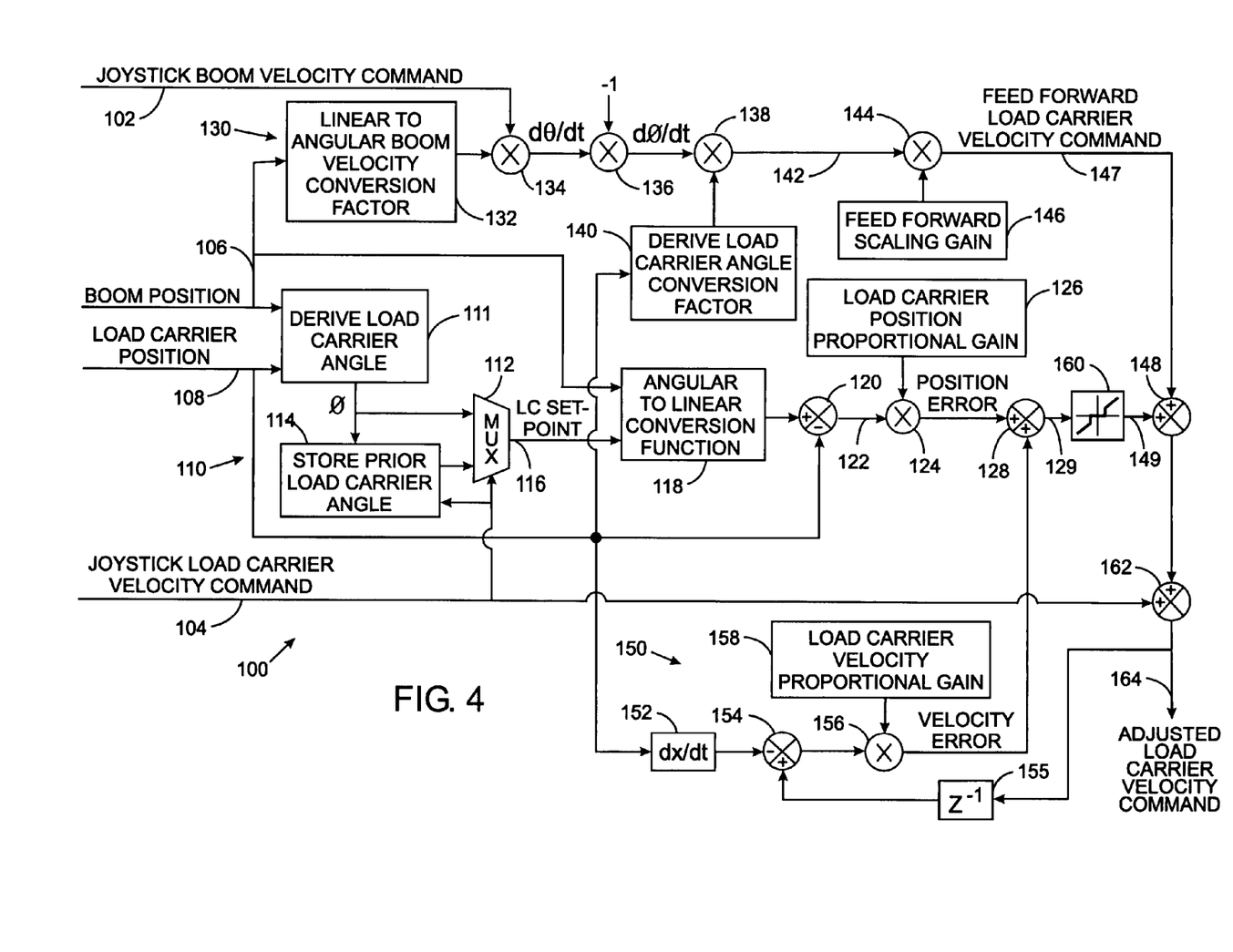
FIG. 4 is a control diagram of a function which automatically maintains the load carrier of the telehandler at a fixed angular relationship to the ground as the boom raises and lowers.

As noted previously, manipulating the first joystick 72 in one direction indicates the linear velocity at which the lift cylinder 16 is desired to operate. This joystick signal, referred to the Joystick Boom Velocity Command, is received on line 102 of the control function 100. Operation of the second joystick 73 provides a Joystick Load Carrier Velocity Command on line 104 which designates a linear velocity for the load carrier cylinder 24. The Boom Position signal from the lift sensor 74 is received on line 106 and the Load Carrier Position signal from sensor 76 appears on line 108.

Boom Position and Joystick Boom Velocity Command are used in a feed forward branch 130 of the control function 100 which commands an angular velocity (dØ/dt) for the load carrier 18. That command counteracts the effects on the load carrier due to the angular velocity (dθ/dt) of the boom 13 that results from the Joystick Boom Velocity Command. To be precise, the velocity relationship dØ/dt=−dθ/dt must be achieved between the boom 13 and load carrier 18.

A fixed kinematic relationship relates the linear velocity of the lift cylinder 16 (the velocity of the piston rod 45 with respect to the cylinder body) to the angular velocity of the boom 13. This relationship is a function of the lift cylinder extension distance "a" and the particular geometric mounting configuration of the boom 13 to the chassis 12 and the lift cylinder 16. Simply put, for a given constant linear velocity of the lift cylinder 16, the resulting boom angular velocity (dθ/dt) varies depending on the extension distance of the lift cylinder. The control function 100 converts the linear Joystick Boom Velocity Command into a corresponding angular velocity. That transformation requires a conversion factor which is produced by operation 132 in response to the Boom Position on line 106. The operation 132 is implemented as a one-dimension first look-up table stored in the memory 82 of the controller 70 which outputs the linear to angular velocity conversion factor. That conversion factor is multiplied by the Joystick Boom Velocity Command at a first multiplier 134 to derive a desired angular boom velocity command at that boom position. Alternatively, the controller 70 may solve an equation that performs this conversion by differentiating Boom Position with respect to time.

In order to achieve the relationship (dØ/dt=−dθ/dt), the calculated angular boom velocity command is multiplied by a negative one at second multiplier 136 to obtain the desired angular velocity (dØ/dt) for the load carrier 18, which is referred to as an angular load carrier velocity command. Operating the load carrier at this angular velocity will maintain a constant angular relationship of the load carrier 18 to the telehandler chassis 12 as the boom 13 is raised and lowered.

A second fixed kinematic relationship correlates the load carrier angular velocity (dØ/dt) to a linear velocity of the load carrier cylinder 24 (velocity of the piston rod 68 with respect to the load carrier cylinder body). According to this second kinematic relationship, the corresponding desired load carrier cylinder linear velocity varies as a function of the extension distance "b" of the load carrier cylinder. Using the Load Carrier Position on line 108, the control function 100 produces a conversion factor in function 140 that is implemented by a one-dimension second look-up table. The resulting conversion factor is multiplied at a third multiplier 138 by the angular load carrier velocity command (dØ/dt) on line 142 to calculate a desired linear load carrier velocity command at that Load Carrier Position. A fourth multiplier 144 applies a constant feed forward scaling gain 146 to the linear load carrier velocity command to produce a Feed Forward Load Carrier Velocity Command on line 147 that is fed to one input of a first summing node 148.

The Feed Forward Load Carrier Velocity Command is modified at the first summing node 148 by the Total Error Output value on line 149. The Total Error Output value results from deviations of the Load Carrier Position and Load Carrier Velocity from desired values for those parameters. A Position Error is determined in control function branch 110 and a Velocity Error is determined in another branch 150.

In order to understand the determination of Position Error in control function branch 110, it should be understood that the tilt angle Ø of the load carrier 18, with respect to a fixed reference (e.g. a line relative to the chassis 12), should not vary as the boom 13 is raised and lowered by extension and retraction of the lift cylinder 16. As a consequence, for a given load carrier tilt angle Ø to be maintained at a given extension distance "a" of the lift cylinder 16, a desired extension distance "b" of the load carrier cylinder 24 has to be calculated.

As stated previously, the Boom Position on line 106 indicates the lift cylinder extension distance "a", and the Load Carrier Position indicates the load carrier cylinder extension distance "b". Control function operation 111 uses those positions to derive the trigonometrically related load carrier tilt angle Ø which can be accomplished in a number of manners, such as by a two-dimension third look-up table stored in the controller memory 82. The third look-up table uses two independent variables, Boom Position and Load Carrier Position, to address a storage location that contains the corresponding value for the dependent variable, the load carrier tilt angle Ø.

The actual load carrier tilt angle Ø then is used to derive a desired load carrier setpoint angle (LC Setpoint). Specifically, the resultant load carrier tilt angle Ø is applied to one input of a multiplexer 112 and to a storage register 114. When the storage register 114 is enabled by any non-zero value of the Joystick Load Carrier Velocity Command, the value of the load carrier angle Ø is stored in that storage register. When the Joystick Load Carrier Velocity Command is zero, the storage operation of the storage register 114 is disabled, and that storage register continuously outputs the previously entered value of the load carrier tilt angle Ø. That output value is applied to the other input of the multiplexer 112 which also is controlled by the Joystick Load Carrier Velocity Command. When that command is zero, the multiplexer 112 conveys the output value from the storage register 114 to an output line 116. Otherwise when the Joystick Load Carrier Velocity Command is not zero, the multiplexer 112 applies the load carrier tilt angle Ø from the derivation function 111 to the output line 116.

The signal on output line 116 is an angular setpoint for the position of the load carrier (LC Setpoint) and designates the angular orientation of the load carrier 18 that is to be maintained as the boom 13 raises or lowers in the absence of a Joystick Load Carrier Velocity Command. Maintaining the load carrier in this fixed angular relationship to the chassis 12 prevents a load from sliding off the load carrier as the boom moves.

Because the hydraulic control of the telehandler 10 utilizes linear velocity commands to operate the hydraulic cylinders 16, 19 and 24, the load carrier angle setpoint on output line 116 must be converted into a corresponding linear setpoint value for the extension of the load carrier cylinder 24. The relationship between those setpoints is dependent on the position of the boom 13 as indicated by the signal from the lift sensor 74. The conversion function 118 is implemented in the controller 70 by a two-dimension fourth look-up table that uses the Boom Position and the load carrier angle setpoint to access a storage location that contains the associated value for the linear setpoint for the load carrier position.

In order to create this fourth look-up table, data defining the relationship of the linear Boom Position, the linear Load Carrier Position, and the tilt angle φ of the load carrier 18 are empirically gathered and tabulated. For example, the lift cylinder 16 is incrementally operated through its entire range of motion. At each lift cylinder position increment, the load carrier tilt angle φ is changed in increments throughout its range of motion. At each load carrier tilt angle φ increment, the load carrier cylinder position is measured. A first data table is then assembled which includes Boom Position and load carrier tilt angle φ as independent variables, and Load Carrier Position as the dependent variable.

Next the first data table is transformed by known techniques, such as by using any of several commercially available computer programs, into a second data table in which the Load Carrier Position and the linear Boom Position are the independent variables and the linear load carrier tilt angle φ becomes the dependent variable. This second data table is stored in the memory 82 of the controller 70 as the two-dimension fourth look-up table for the conversion function 118.

During the operation of the automatic load leveling system, the output of the conversion function 118 is a setpoint for the linear position of the load carrier cylinder 24 in order to keep the load carrier 18 at a fixed orientation to the chassis 12 as the boom 13 raises or lowers. At a second summing node 120, the actual Load Carrier Position, as indicated by sensor 76, is subtracted from the position setpoint to produce a error value on line 122 which represents the amount that the load carrier deviates from the setpoint position. Then at a fifth multiplier 124, the error value is multiplied by a load carrier position proportional gain constant 126 to produce a Position Error that is applied to an input of a third summing node 128.

The total load carrier error on line 129 also has a component corresponding to a velocity error of the load carrier motion. This error component is determined in a velocity branch 150 of the control function 100. Specifically, the Load Carrier Position on line 108 is differentiated at step 152 to obtain the corresponding load carrier velocity that is applied to an inverting input of a fourth summing node 154. A previous value of the Load Carrier Velocity Command at the output of the control function 100 was stored by a unit delay 155 and now is applied to a non-inverting input of the fourth summing node 154. The sum produced by the fourth summing node 154 designates a velocity deviation that is fed to one input of a sixth multiplier 156. A constant load carrier velocity proportional gain value 158 is applied to another input of the sixth multiplier 156 to produce a Velocity Error that is sent to another input of third summing node 128.

The third summing node 128 combines the Position Error and the Velocity Error into a Total Error value that is applied via line 129 to an error limiter 160. The error limiter 160 prevents minute values of the Total Error from causing change of the load carrier position, especially when the telehandler operator is not manipulating the joysticks to move the boom or load carrier. This error limiting function precludes the load carrier from toggling between two positions on opposite sides of the setpoint as could occur if the control function 100 responded to small error values. As a consequence, in order for the control function to alter the Load Carrier Position, the calculated error must exceed a predefined dead band range. In other words the absolute value of the load carrier error must exceed a designated threshold. That dead band range changes depending upon whether the telehandler operator is designating motion of the boom or load carrier.

Figure 5:
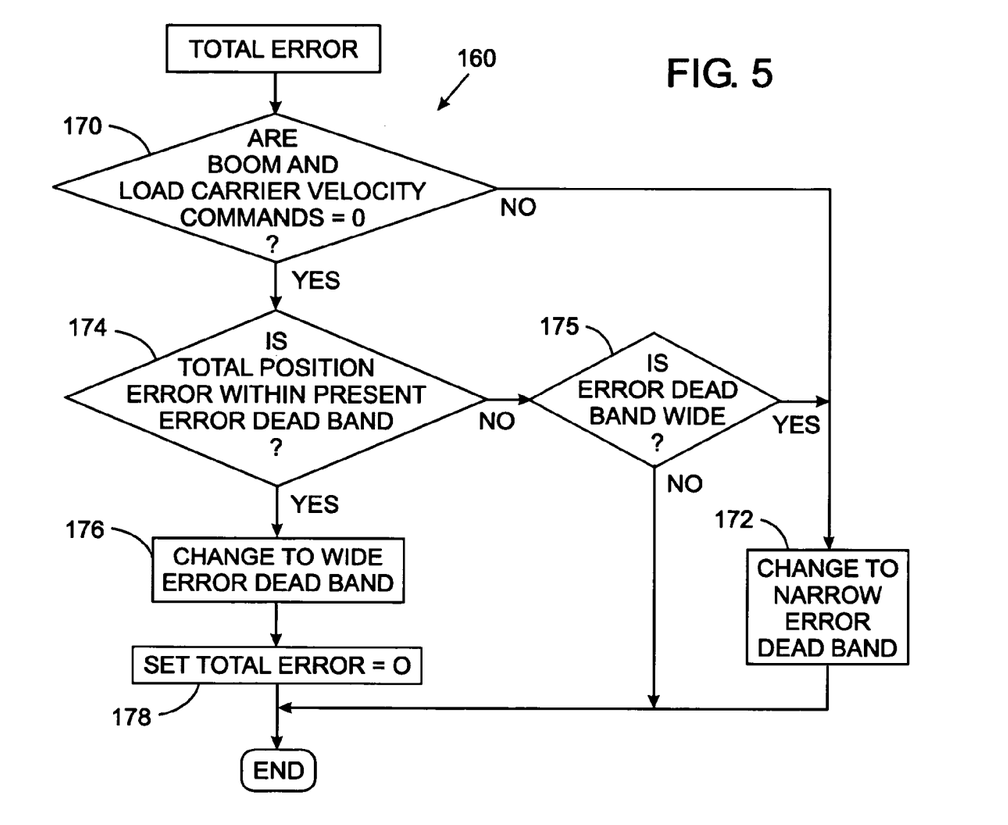
FIG. 5 is a flowchart depicting operation of an error limiter in FIG. 4.

Operation of the error limiter 160 is depicted in FIG. 5 and commences upon receipt of a Total Error value from the third summing node 128. At step 170, a determination is made whether both the Joystick Boom Velocity Command and Load Carrier Velocity Command are zero. If that is not the case, as occurs when the operator is commanding motion of either component, the error limiting process branches to step 172 where the dead band is set to a relatively narrow range, 1.5 millimeters for example. When this dead band is used subsequently, any load carrier error greater than 1.5 millimeters will result in a change in the position of the load carrier 18. Branching through step 172 results in the Total Error received from third summing node 128 being sent unaltered from the error limiter 160 to the first summing node 148.

However, when both the boom and the load carrier velocity commands are found to be zero at step 170, the error limiting process advances to step 174 at which a determination is made whether the Total Error is within the presently active error dead band. If that is not the case, i.e. the error is outside that dead band, the error limiter 160 branches to step 175 at which a determination is made whether the error dead band is set to a wide range, 2.5 millimeters for example. If so the error dead band is set to the narrow range at step 172. In either case the Total Error received from third summing node 128 is sent unaltered from the error limiter 160 to the first summing node 148.

When at step 174, the Total Error is found to be within the presently active error dead band, the limiting process advances to step 176 where the error dead band is changed to the wide range. Thereafter, at step 178, the Total Error value is set to zero so that the position of the load carrier 18 will not be changed due to the relatively small error value. The error limiter 160 passes the zero error value to the first summing node 148.

Thereafter, when the telehandler operator no longer commands a change in the boom or load carrier positions, a relatively wide dead band is active to prevent inconsequential load carrier position errors from triggering automatic error correction. In this condition, however should the position of the load carrier deviate significantly from the setpoint, more than 2.5 millimeters for example, the position of the load carrier will be corrected. When the operator again command motion of either the boom or load carrier, operation of the error limiter 160 will branch from step 170 to step 172 at which the dead band is reset to the narrow range.

The first summing node 148 combines the output of the error limiter 160 with the Feed Forward Velocity Command and the sum is applied to a fifth summing node 162. That sum is added to the Joystick Load Carrier Velocity Command by the a fifth summing node 162 to generate an Adjusted Load Carrier Velocity Command 164 that the controller 70 uses to operate the valves in assembly 62 that control the flow of hydraulic fluid to the load carrier cylinder 24. This Adjusted Load Carrier Velocity Command 164 also is applied to an input of the unit delay 155.

As the telehandler operator requests movement of the boom 13 by operating the first joystick 72, the automatic load leveling function 100 powers the load carrier cylinder 24 to maintain the forks 20 in a fixed orientation to the chassis 12 so that the load does not slide off the load carrier 18. For example, solely lowering the boom 13 normally results in the tips of the forks 20 tilting downward. However with the automatic load leveling function 100 activated, the controller 70 also synchronously operates the third valve assembly 62 for the load carrier tilt function 42 to apply hydraulic fluid which extends the rod from the load carrier cylinder 24. That rod extension changes the position of the load carrier 18 with respect to the end of the boom 13 so that the angle of the forks 20 with respect to the telehandler chassis 12 remains constant. This automatic operation produces a motion of the load carrier 18 which counteracts the boom lowering, thereby keeping the load on the load carrier 18 at a fixed orientation. Likewise as the boom 13 rises, the automatic load leveling function 100 operates third valve assembly 62 to retract the rod into the load carrier cylinder 24 and alter the load carrier 18 position to compensate for the upward tilting of the fork tips that otherwise occurs while the boom is raised.

The foregoing description was primarily directed to preferred embodiments of the present invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. A method for controlling movement of a load carrier that is pivotally attached to a boom which is pivotally mounted on a chassis, wherein a linear load carrier hydraulic actuator produces movement of the load carrier with respect to the boom and a linear lift hydraulic actuator produces movement of the boom with respect to the chassis, the method comprises:

receiving a boom velocity command designating a desired linear velocity for the lift hydraulic actuator;

sensing a position of the lift hydraulic actuator;

sensing a position of the load carrier hydraulic actuator;

deriving a setpoint position for the load carrier in response to the position of the lift hydraulic actuator and the position of the load carrier hydraulic actuator;

producing an error value in response to deviation of an actual load carrier position from the setpoint position;

producing a load carrier velocity command based on the boom velocity command and the position of the lift hydraulic actuator; and employing the load carrier velocity command and the error value to generate an adjusted load carrier velocity command; and operating the load carrier hydraulic actuator in response to the adjusted load carrier velocity command.

2. The method as recited in claim 1 further comprising:

determining a velocity of the load carrier;

generating a velocity error in response to deviation of the velocity of the load carrier from a desired velocity; and wherein producing the error value also is in response to the velocity error.

3. The method as recited in claim 2 further comprising applying a proportional gain to the velocity error value prior to producing the error value.

4. The method as recited in claim 1 further comprising:

deriving a load carrier velocity from the position of the load carrier hydraulic actuator;

determining deviation of the velocity of the load carrier from the adjusted load carrier velocity command to produce a velocity error; and wherein producing the error value also is in response to the velocity error.

5. The method as recited in claim 1 wherein producing the load carrier velocity command comprises:

converting the boom velocity command into a desired angular velocity for the load carrier; and converting the desired angular velocity for the load carrier into a desired linear velocity for the load carrier hydraulic actuator, which desired linear velocity is used as the load carrier velocity command.

6. The method as recited in claim 1 wherein producing the load carrier velocity command comprises:

converting the boom velocity command into an angular boom velocity command;

converting the angular boom velocity command into an angular load carrier velocity command; and converting the angular load carrier velocity command into an linear load carrier velocity command.

7. The method as recited in claim 1 further comprising limiting the error value to a predetermined range of values.

8. The method as recited in claim 1 further comprising setting the error value to zero when the error value is within a predefined range of values.

9. The method as recited in claim 1 further comprising receiving a load carrier velocity command; and wherein deriving a setpoint position is performed only when the a load carrier velocity command designates substantially zero velocity.

10. A method for controlling movement of a load carrier that is pivotally mounted on a boom which is pivotally mounted on a chassis, a linear load carrier hydraulic actuator produces movement of the load carrier with respect to the boom and a linear lift hydraulic actuator produces movement of the boom with respect to the chassis, the method comprises:

receiving a boom velocity command which designates a desired linear velocity for the lift hydraulic actuator;

sensing a position of the lift hydraulic actuator;

sensing a position of the load carrier hydraulic actuator;

deriving a load carrier angular position from the position of the lift hydraulic actuator and the position of the load carrier hydraulic actuator;

defining a setpoint angular position for the load carrier in response to the load carrier angular position;

converting the setpoint angular position into a linear setpoint position for the load carrier;

determining a first deviation of the position of the load carrier hydraulic actuator from the linear setpoint position producing an error value in response to the first deviation;

converting the boom velocity command into an angular boom velocity command;

producing a load carrier velocity command from the angular boom velocity command; and generating an adjusted load carrier velocity command from the load carrier velocity command and the error value; and operating the load carrier hydraulic actuator in response to the adjusted load carrier velocity command.

11. The method as recited in claim 10 further comprising:

determining a velocity of the load carrier;

generating a velocity error in response to deviation of the velocity of the load carrier from a desired velocity; and wherein producing the error value also is in response to the velocity error.

12. The method recited in claim 11 further comprising applying a proportional gain to the velocity error prior to producing the error value.

13. The method as recited in claim 10 further comprising:

deriving a load carrier velocity in response to change of the position of the load carrier hydraulic actuator;

determining deviation of the velocity of the load carrier from the adjusted load carrier velocity command to produce a velocity error; and wherein producing the error value also is in response to the velocity error.

14. The method as recited in claim 10 wherein producing the load carrier velocity command comprises:

converting the angular boom velocity command into an angular load carrier velocity command; and converting the angular load carrier velocity command into an linear load carrier velocity command.

15. The method as recited in claim 10 further comprising limiting the error value to a predetermined range of values.

16. The method as recited in claim 10 further comprising setting the error value to zero when the error value is within a predefined range of values.

17. The method as recited in claim 10 further comprising receiving a load carrier velocity command; and wherein deriving a setpoint position is performed only when the a load carrier velocity command designates substantially a zero velocity.

18. A method for controlling movement of a load carrier pivotally mounted on a boom that is pivotally mounted on a chassis, a linear load carrier hydraulic actuator produces movement of the load carrier with respect to the boom and a linear lift hydraulic actuator produces movement of the boom with respect to the chassis, the method comprises:

receiving a boom velocity command which designates a desired linear velocity for the lift hydraulic actuator;

sensing a position of the lift hydraulic actuator;

sensing a position of the load carrier hydraulic actuator;

deriving a load carrier angular position from the position of the lift hydraulic actuator and the position of the load carrier hydraulic actuator;

producing a load carrier velocity command by:

(a) converting the boom velocity command into an angular boom velocity command, (b) converting the angular boom velocity command into an angular load carrier velocity command, and (c) generating the load carrier velocity command by converting the angular load carrier velocity command into a linear velocity;

producing a position error by:

(d) determining a setpoint angular position for the load carrier from the load carrier angular position, (e) converting the setpoint angular position into a linear setpoint position, and (f) generating the position error in response to deviation of the position of the load carrier hydraulic actuator from the linear setpoint position;

producing a velocity error by:

(g) deriving a load carrier velocity in response to change of the position of the load carrier hydraulic actuator, and (h) generating the velocity error in response to deviation of the velocity of the load carrier from the adjusted load carrier velocity command;

summing the position error and the velocity error to produce a Total Error value;

generating an adjusted load carrier velocity command in response to the load carrier velocity command and the Total Error value; and operating the load carrier hydraulic actuator in response to the adjusted load carrier velocity command.

19. The method as recited in claim 18 further comprising limiting the error value to a predetermined range of values.

20. The method as recited in claim 18 further comprising setting the error value to zero when the error value is within a predefined range of values.

21. A method for controlling movement of a load carrier that is pivotally attached to a boom which is pivotally mounted on a chassis, wherein a linear load carrier hydraulic actuator produces movement of the load carrier with respect to the boom and a linear lift hydraulic actuator produces movement of the boom with respect to the chassis, the method comprises:

receiving a boom velocity command designating a desired velocity for the boom;

sensing a first parameter indicting a pivot angle of the boom;

sensing a second parameter indicting a pivot angle of the load carrier with respect to the boom;

deriving a setpoint position for the load carrier in response to the first parameter and the second parameter;

producing an error value in response to deviation of an actual load carrier position from the setpoint position;

producing a load carrier velocity command based on the boom velocity command and the position of the lift hydraulic actuator; and employing the load carrier velocity command and the error value to generate an adjusted load carrier velocity command; and operating the load carrier hydraulic actuator in response to the adjusted load carrier velocity command.

22. The method as recited in claim 21 further comprising:

determining a velocity of the load carrier;

generating a velocity error in response to deviation of the velocity of the load carrier from a desired velocity; and wherein producing the error value also is in response to the velocity error.

23. The method as recited in claim 22 further comprising applying a proportional gain to the velocity error value prior to producing the error value.

24. The method as recited in claim 21 further comprising:

deriving a load carrier velocity from the position of the load carrier hydraulic actuator;

determining deviation of the velocity of the load carrier from the adjusted load carrier velocity command to produce a velocity error; and wherein producing the error value also is in response to the velocity error.

25. The method as recited in claim 21 wherein producing the load carrier velocity command comprises:

converting the boom velocity command into a desired angular velocity for the load carrier; and converting the desired angular velocity for the load carrier into a desired linear velocity for the load carrier hydraulic actuator, which desired linear velocity is used as the load carrier velocity command.

\* \* \* \* \*